Dec. 9, 1947. J. W. BERTETTI 2,432,136
METHOD FOR CONCENTRATING AQUEOUS SOLUTIONS OF HYGROSCOPIC LIQUIDS
Filed July 27, 1942
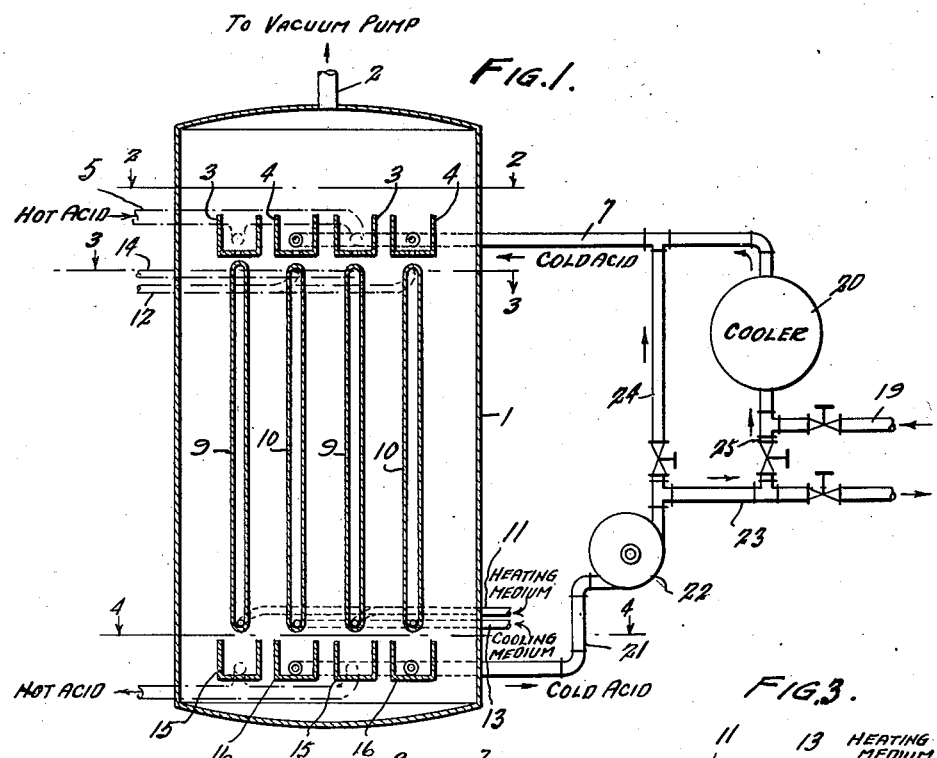
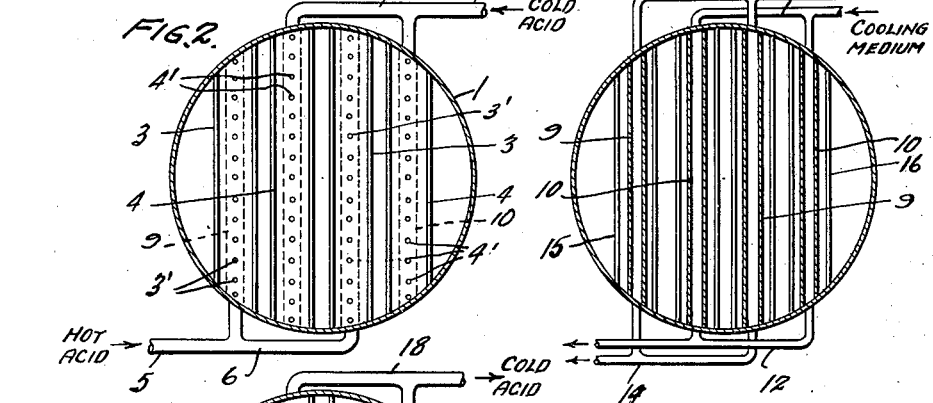
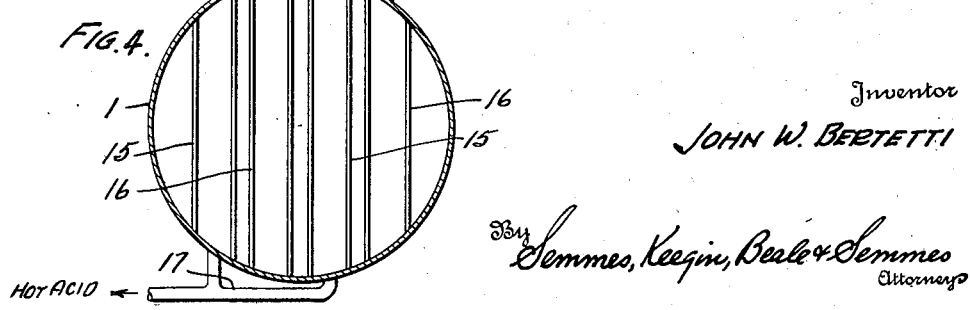
Inventor
JOHN W. BERTETTI
By Semmes, Keegin, Beale & Semmes
Attorneys Patented Dec. 9, 1947

2,432,136

UNITED STATES PATENT OFFICE 2,432,136

METHOD FOR CONCENTRATING AQUEOUS SOLUTIONS OF HYGROSCOPIC LIQUIDS

John W. Bertetti, El Dorado, Ark., assignor to Pan American Refining Corporation, Texas City, Tex., a corporation of Delaware Application July 27, 1942, Serial No. 452,551

7 Claims. (Cl. 23—306)

Generically, my present invention relates to a method and apparatus for concentrating aqueous solutions of hygroscopic liquids and specifically it is directed to a method and apparatus for concentrating sulfuric acid.

Sulfuric acid is widely used as a refining agent in the petroleum industry. One of the more common extensive uses in recent times is in the so-called alkylation process used for producing iso-octane from a mixture of butylene and iso-butane. Aside from the advantage of regenerating the spent acid produced in this treatment from an economic standpoint, it is highly desirable to treat the acid to permit its reuse in order to avoid the necessity of installing some disposal system inasmuch as such acid is generally classified as unsuitable for dumping into sewer systems emptying into public water streams. In order to permit reuse of the acid, it is usually first diluted with water to a strength of 40% to 50% $H_2SO_4$ and is then reconcentrated by distillation in suitable equipment by means of vacuum or by the use of hot flue gases.

Heretofore, considerable difficulty has been encountered in the concentration of spent alkylation sulfuric acid beyond approximately 88–90%. If attempts are made to produce stronger acids by these methods, difficulties are encountered with foaming and with excessive decomposition of the acid. By virtue of the fact that such acid must be fortified for reaction to 98% strength with sulfur tri-oxide, either excessive amounts of 98% are thereby produced or less than the total 88–90% acid available can be fortified. This, of course, presents a disposal problem regarding the excess 88–90% alkylation acid. Since less 98% acid will be provided upon fortifying weak acid with sulfur trioxide as the concentration of the weak acid more closely approaches 98%, it is highly important to remove as much water as possible from the weak acid prior to fortification. It is known that the vapor pressure of water over a solution of sulfuric acid of given strength increases with increasing temperature. I have determined that, by bringing hot acid of comparatively high strength into a predetermined relation to cold acid of approximately the same strength, water vapor will pass from the hot acid to the cold acid. In this manner, the acid is concentrated by a process of diffusion as contrasted with the boiling methods previously used.

Accordingly, an object of the instant application is to provide a novel method of removing water from acid of 90% strength or higher.

Another object of the present invention is to provide a method of concentrating aqueous solutions of hygroscopic liquids wherein separate streams of the liquid of the same concentration are passed at different temperatures in close proximity to each other to cause moisture to pass from the higher temperature liquid to the lower temperature liquid.

And another object is to provide a method of concentrating sulfuric acid wherein hot sulfuric acid of comparatively high strength is brought into relation with cold sulfuric acid of approximately the same strength in such a way that the moisture will pass from the hot acid to the cold acid.

Yet a further object of the present invention is to provide a process of concentrating sulfuric acid wherein two separate streams of the acid are maintained in a zone of reduced pressure and the vapor pressures of the separate streams are so controlled that the water content of one stream passes to the other stream.

Still a further object of this invention is to provide an apparatus for concentrating aqueous solutions of hygroscopic liquids such as sulfuric acid comprising a closed vessel having means therein for passing two separate exposed streams of liquid therethrough at different temperatures.

An additional object is to provide an apparatus of the character described comprising a closed vessel having disposed therein a plurality of hollow heat exchange elements over some of which a stream of hot sulfuric acid is adapted to pass and over the others of which a stream of cold sulfuric acid is adapted to pass, means to heat the elements over which the hot acid passes, and further means to cool the elements over which the cold acid passes whereby moisture will pass from the hot acid to the cold acid.

With these and other objects in view, which may be incident to my improvements, the invention consists in the parts and combinations to be hereinafter set forth and claimed, with the understanding that the several necessary elements comprising my invention may be varied in construction, proportions and arrangements, without departing from the spirit and scope of the appended claims.

In the drawings, in which like numerals indicate the same or similar parts:

Figure 1 is a transverse sectional view of an apparatus for carrying out the present invention.

Figure 2 is a view taken along the line 2—2 of Figure 1 looking in the direction of the arrows.

Figure 3 is a view taken along line 3—3 of Figure 1 looking in the direction of the arrows.

Figure 4 is a view taken along the line 4—4 of Figure 1 looking in the direction of the arrows.

In the drawings it will be noted that I provide a closed chamber or drum 1 that is adapted to be evacuated by exhausting the air therefrom through a line 2 in the upper end of the drum by means of a vacuum pump or the like (not shown). Suitably supported within the drum adjacent the upper end thereof are a plurality of distributing troughs 3 for the reception of hot sulfuric acid and a plurality of similar troughs 4 for cold sulfuric acid. The troughs 3 and 4 are formed with a series of apertures 3' and 4', respectively, in their bottom walls to permit the hot and cold acid to flow therefrom. The hot acid is introduced from an inlet conduit 5 into the troughs 3 by means of a manifold 6. The cold acid is admitted into the troughs 4 from conduit 7 through a second manifold 8. This acid is obtained from an evaporator or other source of supply (not shown) and is introduced through conduit 19 from which it is passed through cooler 20 and thence through line 7 into the drum 1.

Located beneath each trough 3 is a vertical hollow heat exchange unit 9. A similar heat exchange unit 10 is positioned beneath each cold acid trough 4. The heat exchange units 9 and 10 may be supported within the drum 1 in any suitable or convenient manner. A heating medium is introduced into the lower end of each heat exchange unit 9 through conduits 11 and discharged therefrom at the upper end through conduits 12. A cooling medium is introduced into the bottom of each unit 10 through lines 13 and is removed from the upper end by means of conduits or pipes 14. The purpose of the units 9 and 10 will hereinafter be more fully described.

A hot acid collection trough 15 is positioned beneath each heat exchange unit 9 and a similar cold acid collection trough 16 is disposed beneath each unit 10. A manifold 17 is in communication with the troughs 15 for collecting the hot concentrated sulfuric acid. A similar manifold 18 is connected with the troughs 16 for collecting the cold sulfuric acid.

Extending from the manifold 18 is a conduit 21 connected with the intake of pump 22. The discharge end of pump 22 is connected to the discharge line 23 which communicates either with a collection container or to an evaporator from which the original supply of cold acid was obtained.

A branch conduit 24 serves to connect the discharge of the pump directly to line 7 for recirculation of the cold acid. If desired, the discharge of the pump may be connected by line 25 to the line 19 for passage through the cooler 20.

Briefly, the operation is as follows: The drum 1 is first evacuated to a suitable low pressure such as, for example, 100 mm. of mercury. Hot sulfuric acid of approximately 90% strength is then introduced into the troughs 3 through the conduit 5 and the manifold 6. The temperature of the acid introduced is such that the vapor pressure is approximately 100 mm. so that no boiling will occur when the acid reaches the inlet of the concentrator. When acid is first introduced, the total pressure will increase making it necessary to evacuate air originally present in order to maintain 100 mm. of pressure. The ultimate pressure will be governed approximately by the vapor pressure of the hot acid introduced into the diffusion chamber and will generally be somewhat less than the vapor pressure of the acid feed. Simultaneously cold sulfuric acid of approximately the same strength (90%) is introduced into the troughs 4 through the line 7 and the manifold 8. The hot acid flows from the troughs 3 through the apertures 3' over the outer surfaces of the heat exchange units 9 and similarly the cold acid flows over the outer surfaces of units 10. Since the rate of diffusion is inversely proportional to the distance between the plates, these plates should be set as close together as practicable. By virtue of the fact that a heating medium is being passed through the units 9 and a cooling medium is circulating through units 10, substantially isothermal conditions will be maintained and water vapor will pass by diffusion from the hot acid flowing over units 9 to the cold acid passing down the units 10. This means that the strength of the hot acid will be increased and that of the cold acid will be decreased. The hot acid will then pass from the troughs 15 through the manifold 17 to a suitable collection or storage receptacle (not shown). The cold acid may be pumped from the manifold 18 by pump 22 either directly to the line 7, or through the cooler 20. Alternatively, it may be returned to the evaporator for reconcentration to 90% strength through line 23. The above absolute pressure of 100 mm. is cited by way of example, and the operating pressure normally used will correspond to the vapor pressure, at the operating temperature, of the previous concentrating equipment from which the hot 90% acid is drawn.

From the above description, it is thought readily apparent that I have provided a novel method and means whereby water may be removed from sulfuric acid of concentrations of 90% or higher. By virtue of my invention it is possible to bring hot acid of comparatively high concentration in such relation to cold acid of substantially the same concentration that water vapor will pass from the hot acid to the cold acid, thereby increasing the strength of the hot acid. The process and apparatus find particular application in concentrating spent alkylation sulfuric acid, but, of course, it is of broader scope.

While I have shown and described the preferred embodiment of my invention, I wish it to be understood that I do not confine myself to the precise details of construction herein set forth by way of illustration, as it is apparent that many changes and variations may be made therein, by those skilled in the art, without departing from the spirit of the invention, or exceeding the scope of the appended claims.

I claim:

1. The method of concentrating aqueous solutions of hygroscopic liquids having substantially the same water content which comprises the steps of supplying a first stream of such liquid to a concentrating zone at a temperature below the boiling point of the liquid at the operating pressure, supplying a second stream of the liquid to the concentrating zone at a lower temperature than the first stream, maintaining said streams as separate moving bodies of liquid in vapor contact within said concentrating zone, diffusing water vapor from the higher-temperature stream to the lower-temperature stream which has a definite dehydrating effect, and separately withdrawing streams of liquid from the concentrating zone, the higher-temperature stream having a higher proportion of the hygroscopic liquid and the lower temperature stream having a higher proportion of water than when the streams entered the concentrating zone.

2. The method of concentrating dilute sulfuric acid which comprises heating dilute acid and evaporating water therefrom until the concentration is above about 88–90%, supplying a first stream of the hot 88–90% acid to a low pressure concentrating zone, cooling a second stream of 88–90% acid, separately supplying the cooled stream of acid to the concentrating zone, maintaining the said streams as separate moving bodies of liquid in vapor contact within said concentrating zone, maintaining a temperature differential between said bodies, diffusing water vapor from the higher-temperature stream to the lower temperature stream, and separately withdrawing streams of liquid from the concentrating zone.

3. The method of further concentrating relatively concentrated aqueous solutions of hygroscopic liquids of substantially the same water content comprising the steps of precooling one stream of liquid having a definite dehydrating effect, passing separate streams of the liquid in thin films over separate heat exchange surfaces within a concentrating zone, maintaining a temperature differential between said films by adding heat to the first film and by extracting heat from the second film, maintaining said concentrating zone at a pressure below the vapor pressure of the higher temperature film, whereby water is transferred from the hot film and adsorbed in the cool film, and separately collecting the two films of liquid having substantially different water content.

4. The method of concentrating dilute sulfuric acid spent in the alkylation of hydrocarbons which comprises the steps of heating the spent acid in a first concentration zone and evaporating water therefrom to produce an acid stream having a dehydratable acidity of about 90%, maintaining a second concentration zone at a pressure corresponding to the vapor pressure in the first concentrating zone from which the 90% acid is produced, supplying a first stream of the 90% acid to said second concentrating zone, precooling a second stream of 90% acid, separately supplying the precooled stream of acid to the second concentrating zone, flowing said streams separately through said second concentrating zone in thin films, independently supplying heat to the first of said films and abstracting heat from the second of said films whereby water is diffused from said first film to said second film, collecting said films separately and withdrawing as separate streams from said concentrating zone, recycling at least a portion of said second stream to said second concentrating zone and returning at least another portion of said second stream to said first concentrating zone.

5. The method of further concentrating aqueous solutions of hygroscopic liquids having a definite dehydrating effect comprising the steps of introducing separate streams of such hygroscopic liquid having substantially the same water content into a confined zone at sub-atmospheric pressure, maintaining one stream at relatively high temperature and the other stream at a relatively low temperature while passing through said confined zone in vapor contact, said relatively high temperature being below the boiling point of the liquid under the pressure within the confined zone, and separately recovering a stream of hygroscopic liquid having an increased water content.

6. The method of concentrating an aqueous solution of sulfuric acid having an initial concentration of at least about 88% and having a definite dehydrating effect, the steps which comprise introducing separate streams of sulfuric acid of substantially the same concentration through a confined zone in vapor contact, maintaining one stream at a high temperature and maintaining another stream at a low temperature while passing though said zone, the high temperature being below the boiling point of the sulfuric acid under the pressure within the confined zone, and recovering a separate stream of sulfuric acid of substantially higher concentration than the acid supplied to the confined zone.

7. The method for concentrating a solution of sulfuric acid which has a definite dehydrating effect comprising flowing a solution of said acid in a film in indirect heat exchange with a relatively highly heated exchange medium, flowing a second separate stream from a separate source of acid over an adjacent heat exchange surface containing a relatively cool heat exchange medium, maintaining the temperature of the relatively high temperature film below its boiling point at the pressure on the system and separately withdrawing the high and low temperature streams.

JOHN W. BERTETTI.

REFERENCES CITED

The following references are of record in the file of this patent:

UNITED STATES PATENTS

| Number | Name | Date |
| --- | --- | --- |
| 2,247,152 | Cornell | June 24, 1941 |
| 1,323,847 | Dryen | Dec. 2, 1919 |
| 2,126,467 | Hickman | Aug. 9, 1938 |
| 1,913,468 | Altenkirch | June 13, 1933 |
| 1,913,469 | Altenkirch | June 13, 1933 |
| 1,589,504 | Agopian | June 22, 1926 |
| 2,124,729 | Castner et al. | July 26, 1938 |
| 1,481,723 | Merz | Jan. 22, 1924 |

FOREIGN PATENTS

| Number | Country | Date |
| --- | --- | --- |
| 25,800 | Great Britain | 1911 |
| 279,526 | Great Britain | Oct. 31, 1927 |